US006710491B2

United States Patent
Wu et al.

(10) Patent No.: US 6,710,491 B2
(45) Date of Patent: Mar. 23, 2004

(54) ROLLER DEVICE WITH DYNAMIC FUNCTION

(75) Inventors: Mu-Chuan Wu, Tainan Hsien (TW); Bor-Jeng Lin, Tainan (TW); Mi-Ching Tsai, Tainan (TW); Shang-Hsun Mao, Tainan (TW)

(73) Assignee: Tonic Fitness Technology, Inc. (TW)

( * ) Notice: Subject to any disclaimer, the term of this patent is extended or adjusted under 35 U.S.C. 154(b) by 102 days.

(21) Appl. No.: 09/984,588

(22) Filed: Oct. 30, 2001

(65) Prior Publication Data

US 2003/0080639 A1 May 1, 2003

(51) Int. Cl.$^7$ ............................................... H02K 16/00
(52) U.S. Cl. ..................... 310/112; 310/67 R; 310/114; 310/156.25; 310/254; 482/54
(58) Field of Search ................... 310/67 R, 112, 310/114, 156.25, 254, 261; 482/54

(56) References Cited

U.S. PATENT DOCUMENTS

| | | | | |
|---|---|---|---|---|
| 2,261,477 A | * | 11/1941 | Kuner ........................... 310/112 |
| 4,121,127 A | * | 10/1978 | Adelski et al. ............ 310/67 R |
| 4,291,235 A | * | 9/1981 | Bergey, Jr. et al. ........... 290/55 |
| 5,524,805 A | * | 6/1996 | Shiba et al. .................. 226/108 |
| 6,244,427 B1 | * | 6/2001 | Syverson ....................... 198/788 |
| 6,455,960 B1 | * | 9/2002 | Trago et al. ................... 310/64 |
| 2002/0158543 A1 | * | 10/2002 | Wolters ......................... 310/254 |

FOREIGN PATENT DOCUMENTS

| | | | |
|---|---|---|---|
| JP | 5-207712 | * | 8/1993 |
| WO | PCT/US99/13145 | * | 12/1999 |

* cited by examiner

Primary Examiner—Tran Nguyen
Assistant Examiner—David W. Scheuermann
(74) Attorney, Agent, or Firm—Bacon & Thomas, PLLC

(57) ABSTRACT

The device includes at least a roller unit having a fixed immovable shaft rod combined with two coiled stator units having silicon steel stators respectively wound with a coil. Each coil stator unit has its outer circumference covered by a tubular-shaped magnet rotor unit having magnet rotors fitted inside, with every two abutting magnets axially and biasly positioned. A combination unit composed of a bearing and a bearing outer cover is fixed respectively at two ends of the magnet rotor unit. The roller unit includes gaps between the magnet rotors and gaps between the magnet rotors and the silicon steel stator. When the coiled stator units are electrically connected, the magnet rotor unit will rotate around the coiled stator unit.

3 Claims, 7 Drawing Sheets

ROLLER DEVICE WITH DYNAMIC FUNCTION

BACKGROUND OF THE INVENTION

This invention relates to a roller device with dynamic function by combining an outer circuit-shaped motor with a shaft to form an elongated shaft motor, particularly to one having an immediate driving potentiality itself, needless to depend on an outer power for driving, applicable to varied objects and having extensive suitability.

A conventional running machine 200, as shown in FIG. 1, includes an elongate base 20 provided with a front and a rear roller 202 and 203 for a running belt 201 to fit around and be supported therein. The front roller 202 is driven by a motor 205 positioned in a chamber 204 in the front (usually transmitted by the running belt 206). Thus, when the motor 205 is started to drive the front roller 202 to rotate, the running belt 206 will be activated to move and force the rear roller 203 to rotate.

As can be noted that the motor 205 has to be provided as a source of motive power for carrying on transmission. In this case, there must be a space large enough for placing the motor 205. For instance, if the running machine 200 is 1.8 m long and the runway is 1.5 m in length, then the remaining space is all used for placing the motor 205. Besides, the longer a runway is, the larger the horsepower of a motor must be, and the larger the horsepower is, the bigger size of a motor will be, thus taking too much space for placing the motor and resulting in inconvenience in use.

SUMMARY OF THE INVENTION

One objective of the invention is to offer a roller device with dynamic function having a driving potentiality, needless to depend on an outer power for driving.

Another objective of the invention is to offer a roller device with dynamic function, applicable to various objects and having extensive adaptability.

The roller device consists of at least one roller unit provided with a shaft having its opposite ends fixed immovable. The shaft is closely fitted through a coil stator unit including two silicon steel stators fasteners respectively wound with a coil, with a center separating ring fitted between two silicon steel stators and two side separating rings respectively positioned at outer ends. Then, a tube-shaped magnet rotor unit is provided around the outer circumference of the coil e d stator unit, composed of two semi-tubular-shaped casings. In addition, a plurality of magnet rotors corresponding to the silicon steel stator are axially and biasly positioned on inner recesses of the casing and then two semi-tubular-shaped casings cover up the coiled stator unit and are fixed together with bolts.

Further, A combination unit is provided at the opposite ends of the magnet rotor unit, consisting of two bearings respectively fitted around the opposite end sides of the coiled stator unit, two bearing outer covers firmly screwed on the opposite ends of the magnet rotor unit and a position ring provided to keep the coiled stator unit and the magnet rotor unit positioned axially and avoid any gap formed between them after assembled. Thus, the roller unit is completely assembled, having gaps between the magnets and gaps between the magnets and the silicon steel stators so as to get rid of unbalance of magnetic force during rotating. When the coiled stator unit is electrified, the magnet rotor unit will rotate around the coiled stator unit and output motive power.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
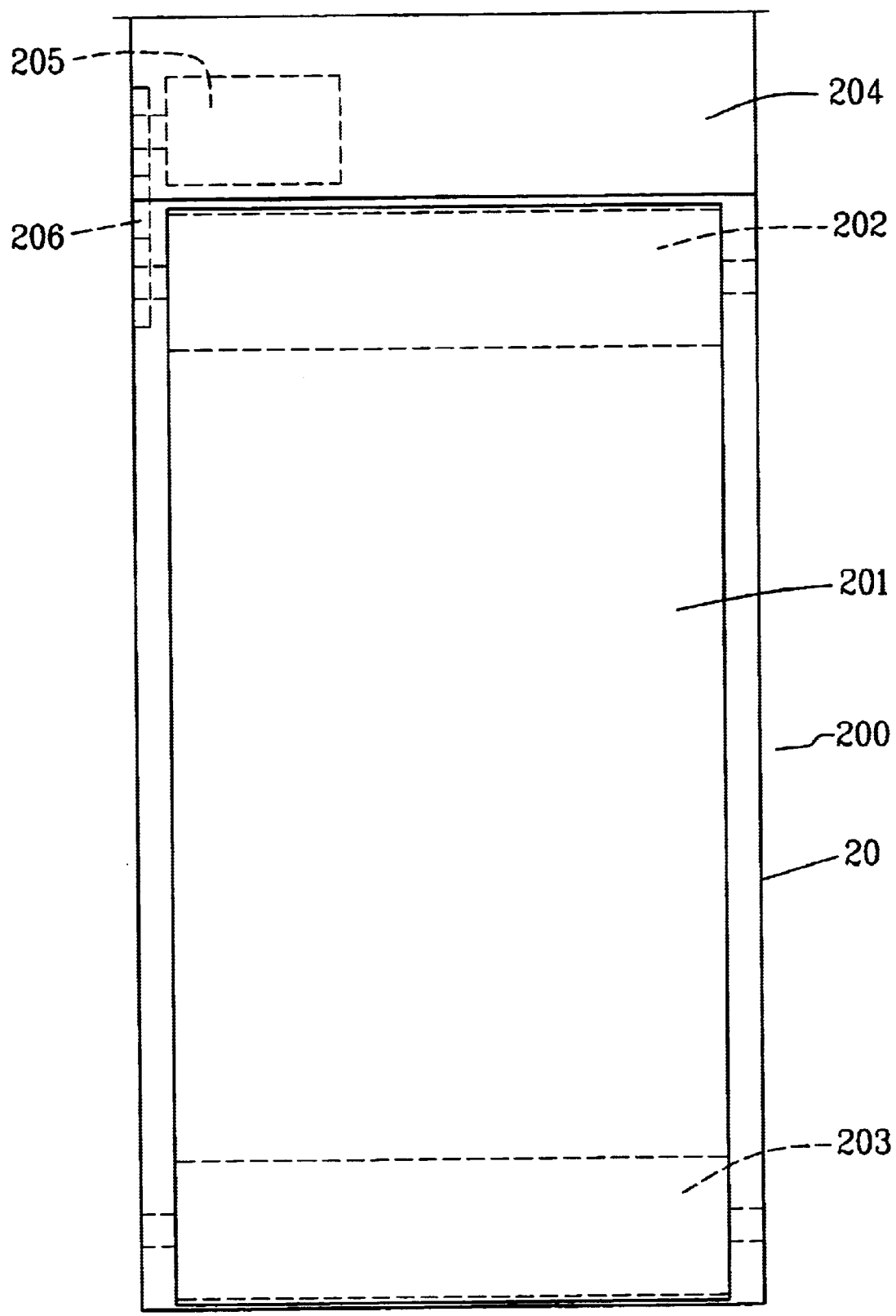
FIG. 1 is an upper view of a conventional running machine.
Figure 2:
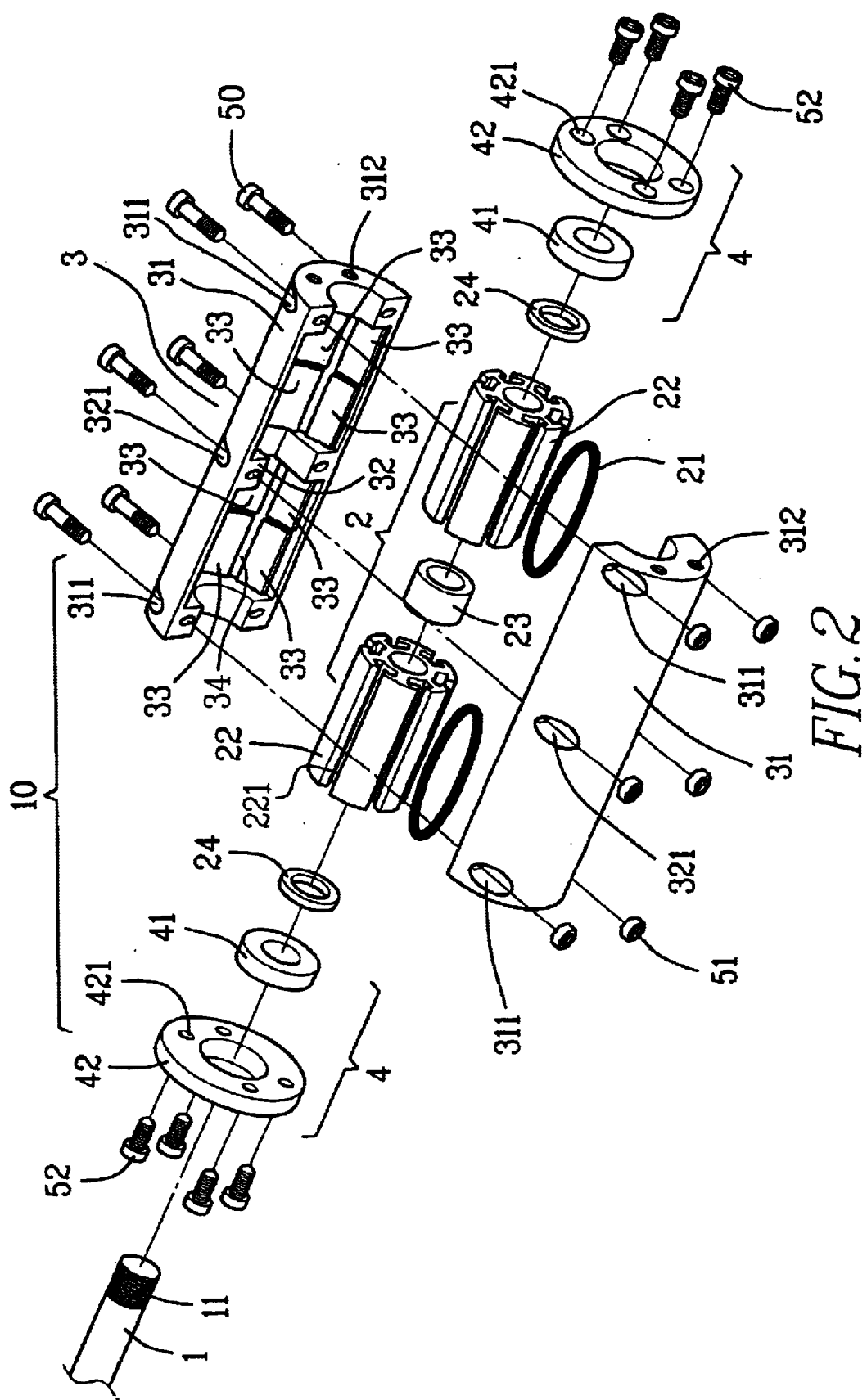
FIG. 2 is an exploded perspective view of a roller unit in the present invention.

A preferred embodiment of a roller device with dynamic function in the present invention, as shown in FIG. 2, includes one or more independent roller unit(s) 10, a shaft rod 1, a coiled stator unit 2, a magnet rotor unit 3 and a combination unit 4 as main components combined together.

The coiled stator unit 2 consists of two silicon steel stators 22 respectively wound by a coil 21. The two silicon steel stators 22 are inserted and connected together by the shaft rod 1, having a center separating ring 23 positioned between them and two side separating rings 24 respectively positioned at the opposite ends.

The magnet unit 3 includes two semi-tubular-shaped hollow casings 31, each having two through holes 311 bored relatively in the opposite ends of the outer wall surface, and a projection 32 with a through hole 321 positioned correspondingly at a center section. The projection 32 divides the inner annular surface into two compartments just for receiving the two silicon steel stators 22 therein. Then, a plurality of magnets 33 are axially and biasly fixed in the inner recessed wall of the two compartments, and several screw holes 312 are bored on the opposite end surfaces of the casing 31.

Figure 3:
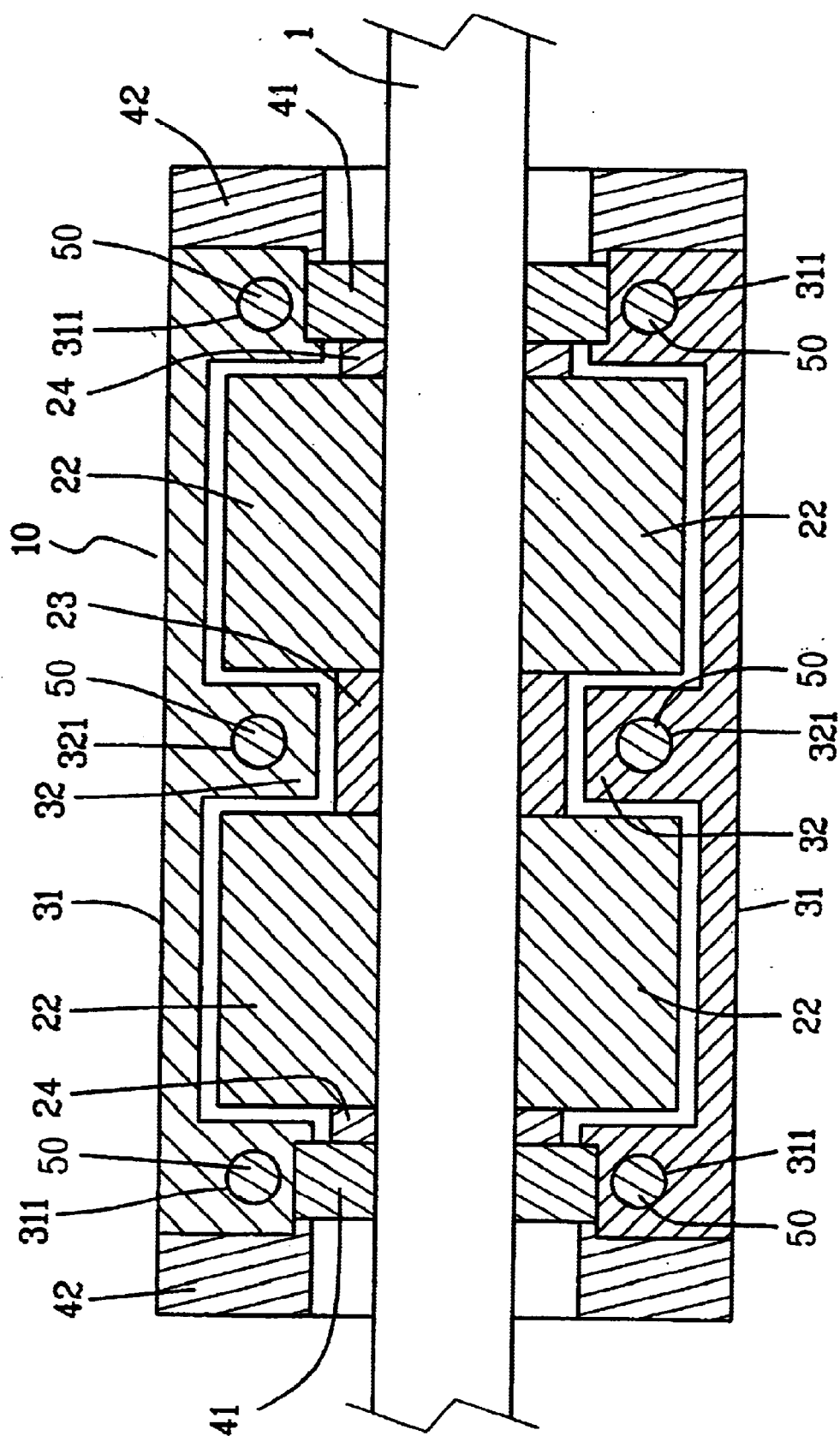
FIG. 3 is a cross-sectional view of the roller unit in the present invention.

The combination unit 4 is composed of a bearing 41 and a bearing outer cover 42 with a plurality of through holes 421. The bearing 41 is positioned between the shaft rod 1 and the inner wall of the end of two casings 31, as shown in FIG. 3. The bearing outer cover 42 is screwed together with the casings 31 by means of bolts 52 screwing through the through holes 421 and the screw holes 312.

In assembling the roller unit 10, as shown in FIG. 3, firstly, the coiled stator unit 2 is closely fitted around the shaft rod 1, with the center separating ring 23 and the side separating rings 24 respectively positioned between two silicon steel stators 22 and at an Outer side of each stator 22. Next, two semi-tubular-shaped casings 31 cover up around the coiled stator unit 2 and are combined together by bolts 50 diametrically screwing through the through holes 311 and 321 on the end wall of the casings 31 as well as on the center projection 32 and firmly screwed together therein with nuts 51, forming a cylinder-shaped magnet unit 3. Further, the magnets 33 are positioned axially and biasly in the inner recessed wall of the magnet unit 3 so the position of the gap between two abutting magnets 33 is different from that of the coiled stators 22.

As shown in FIG. 2, there are gaps 34 between magnets 33, and gaps 221 in the silicon steel stators 22.

Lastly, the bearings 41 and the bearing outer covers 42 of the combination unit 4 are orderly fitted around the shaft rod 1, with the bearings 41 positioned on the opposite ends of the coil fastener unit 2 and the bearing outer covers 42 respectively positioned closely on the opposite surfaces of the magnet unit 3 and then fixedly combined together with bolts 52 axially inserting through the through holes 421 of the bearing outer cover 42 and the screw holes 312 of the casing 31. Thus, the magnet rotor unit 3 of the casings 31 and the silicon steel stators 22 are diametrically positioned by the bolts 50 as well as the bearing outer covers 42, maintaining a definite gap between them, and they are also axially positioned by the bolts 52, the center separating ring 23 and the side separating rings 24, thus finishing assembling an independent roller unit 10.

Figure 4:
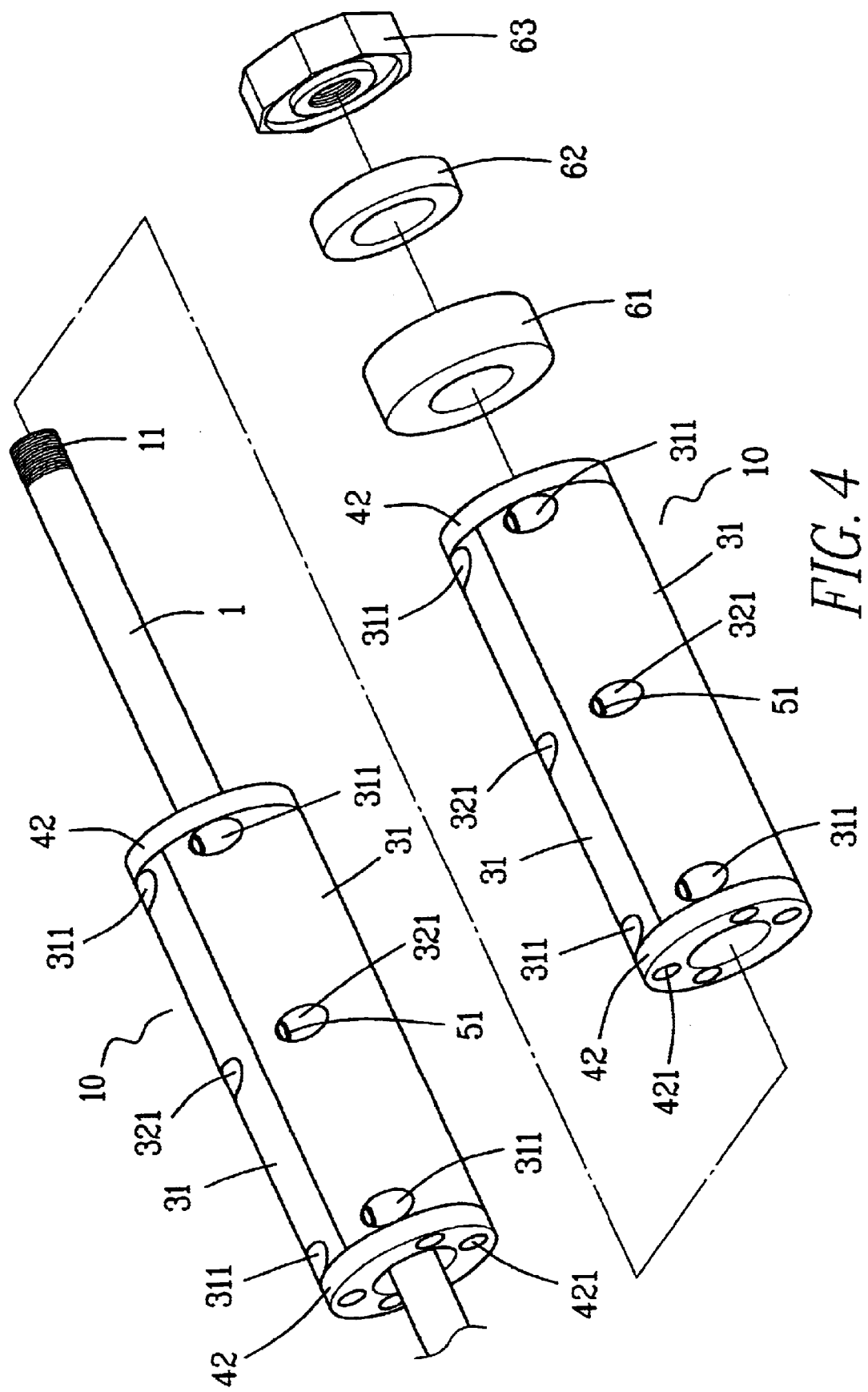
FIG. 4 is an exploded perspective view of a roller device in the present invention.
Figure 5:
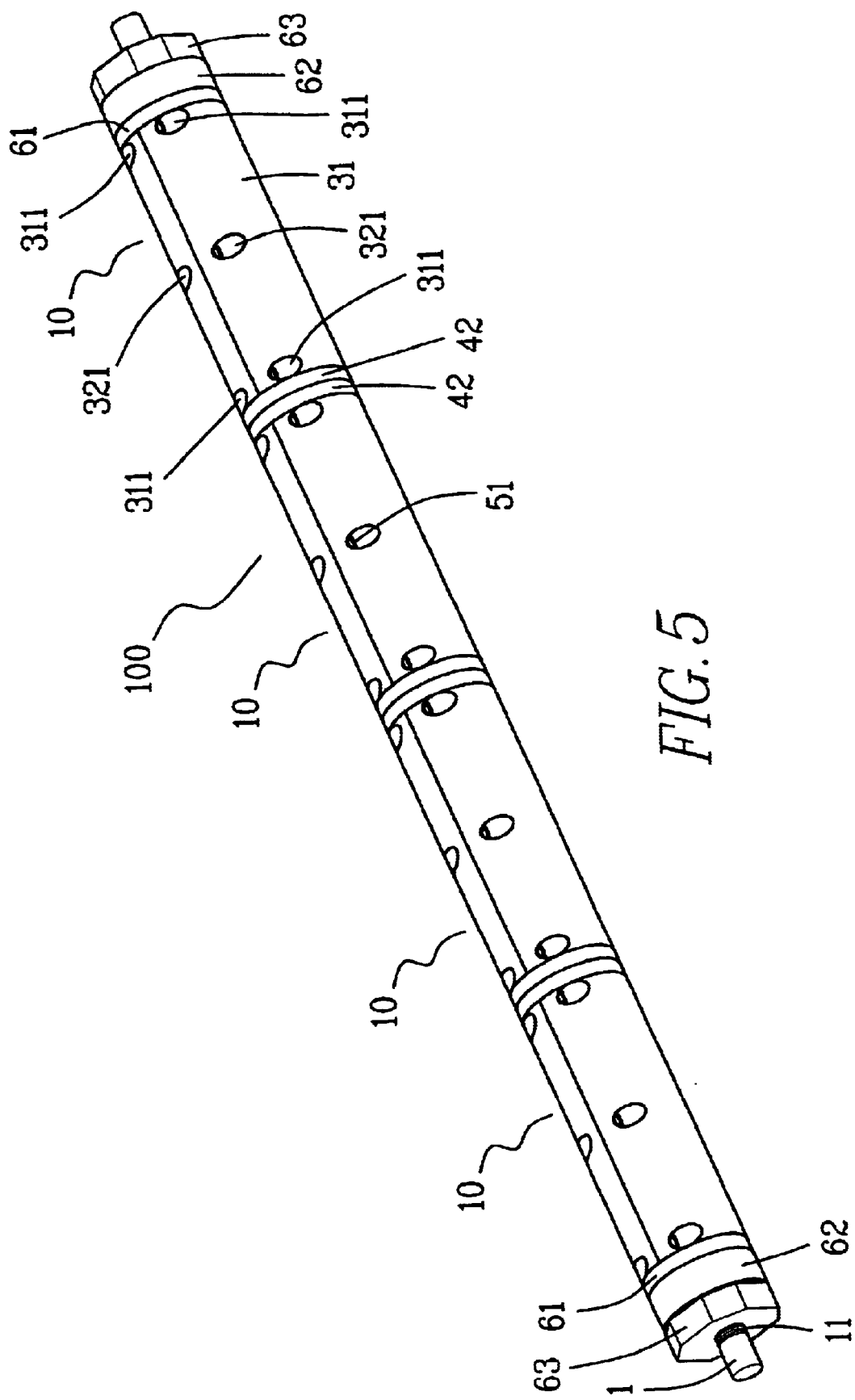
FIG. 5 is a perspective view of the roller device in the present invention.

In using, a relatively short or long roller device 100, as shown in FIGS. 4 and 5, can selectively be used depending on practical needs. For example, in case the roller device 100 is used in a running machine, firstly, a shaft rod 1 of a proper length has to be prepared to conform to the width of the running belt 201 of a running machine. Next the shaft 1 having threaded portions 11 formed at opposite ends connects several roller units 10 in series, with the bearing outer cover 42 of each roller unit 10 resting against each other. Lastly, as shown in FIGS. 4 and 5, an outer rotating base 61, a stop bearing 62 and an inner bearing base 63 are fitted around the end side of the outermost roller unit 10 so as to let all the roller units 10 combined in alignment. Subsequently, the outer rotating base 61, the stop bearing 62 and the inner bearing base 63 are axially secured on the shaft rod 1 to ensure integral inflexibility of assembly and support an axial load caused by bending of the shaft rod 1.

Figure 6:
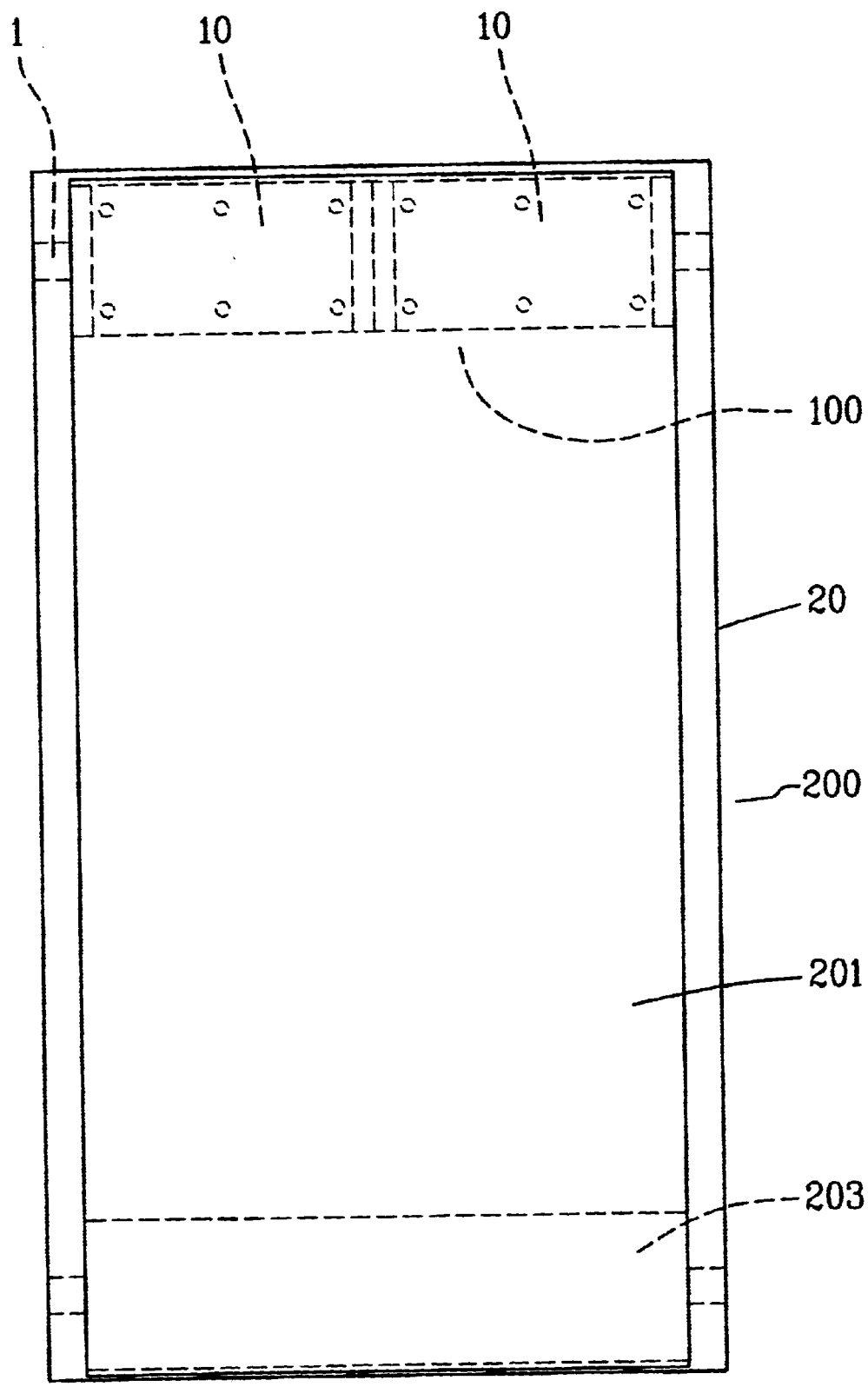
FIG. 6 is an upper view of the roller device applied to a running machine in the present invention.

Thus, a roller device 100 for a running machine 20 is completed and then this roller device 100 is assembled at a front side of the machine base 20 of a running machine 20, as shown in FIG. 6, to let the shaft rod 1 fixed on the machine base 20, and next a rear roller 203 is additionally provided and finally a running belt 201 is fitted around the front and the rear rollers 10 and 203. Accordingly a running machine 200 is completed, needless to be driven by external force (like a motor and a belt).

In using such a running machine 200, only start electric source to electrify the coiled stator unit 2 in each roller unit 10, and then the magnet rotor units 3 together with the casings 31 fitted around the outer circumference of the shaft rod 1 fixed on the machine base 20 will begin to rotate around the coiled stator units 2 and activate the running belt 201 and the rear roller 203 to rotate at the same time. As can be noted from the above description, the roller device 100 of this invention has a direct dynamic function to substitute for a motor for driving other components to rotate.

Figure 7:
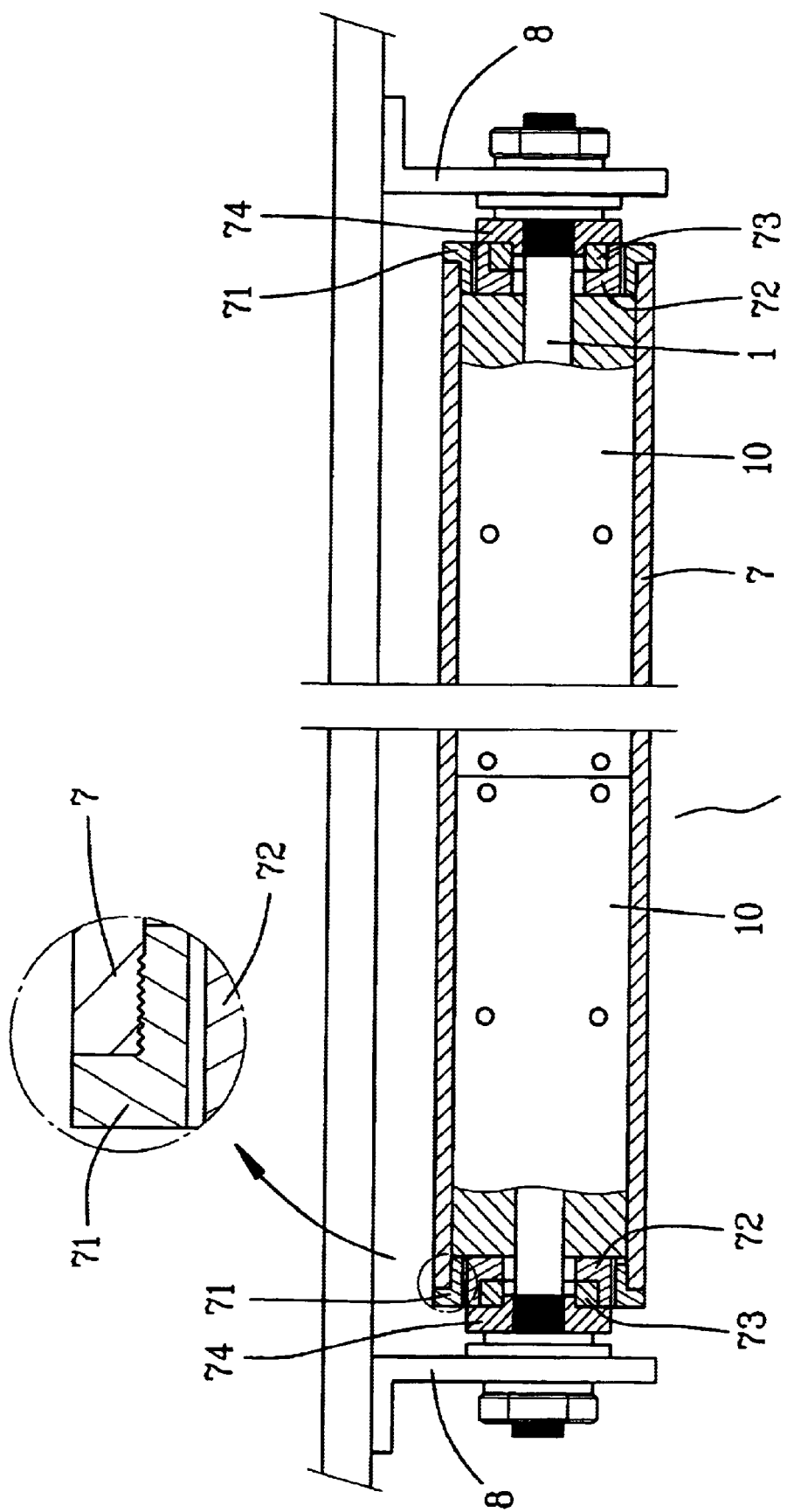
FIG. 7 is a cross-sectional view of the roller device assembled in another way in the present invention.

Furthermore, there is another way for assembling a roller device 100', as shown in FIG. 7. Firstly, several roller units 10 assembled together in advance and the shaft rod 1 are positioned in a hollow cylinder 7 of a proper length. The cylinder 7 has female threads formed in the inner wall of opposite ends to be threadably fixed with an interior hollow end cover 71 closely pushing against the end side of the outermost roller unit 10 so as to make all the roller units 10 positioned in the cylinder 7.

Next, an outer support base 72, a stop bearing 73 and an inner support base 74 in the end cover 71 are orderly fitted around the opposite ends of the shaft rod 1, thus finishing a long cylinder-shaped roller device 100'. Lastly, the shaft rod 1 protruding out of the opposite ends of the cylinder 7 are firmly secured on preset support bases 8 respectively and then electrically connected to drive the roller units 10 inside to rotate together with the cylinder 7 outside.

The roller device 100 of this invention has the following advantages as can be understood from the above description.

1. It can substitute for the motor of a conventional running machine 200 to serve as a power source, therefore the whole length of the machine base 20 of a running machine 200 can be shortened, the space for placing the running machine 200 reduced and, because the roller device 100 can also be used as the front and the rear rollers of a running machine 200, it can supply a power large enough to drive the running belt 201 to move even if the runway of the running machine 200 is lengthened.

2. The magnets 33 of the magnet unit 3 are axially but biasly positioned so as to prevent the gaps 33 of the magnets 33 and the gaps 221 of the silicon steel stators 22 from being aligned and causing resonance, preventing the roller units 10 from making vibration or noise. As shown in FIG. 2, the magnets 33 of the magnet unit 3 are axially and biasly positioned, with the gaps 34 therebetween substantially forming an axially oblique line. However, the gaps 221 of the silicon steel stators 22 from an axially straight line. Therefore the position of the gap 34 between two abutting magnets 33 in the magnet unit 3 is different from that of the coiled stators 22. This difference prevents the gaps 34 of the magnets 33 and the gaps 221 of the silicon steel stators from becoming in correspondence and causing resonance, thus minimizing vibration and noise.

3. Each roller unit 10 is composed of two coiled stator units 2 and two magnet rotor units 3 to form an elongate roller with motive power so that the problems of producing and assembling elongated magnets can be solved, and the way of producing silicon steel strips and magnets is the same as a conventional one, accordingly lowering producing cost and reducing difficulty in producing.

The preferred embodiment of the roller device with dynamic function of this invention has been described above by taking a running machine 200 for example. However, the preferred embodiment can apply to any shaft-like object so long as it is originally driven to rotate by a motor, a belt or gears. For instance, it can be applied to a curtain rolling machine (plural roller units 10 applicable) or to a winch (a single roller unit applicable) or the like to roll up a curtain or ropes directly by its own motive power, needless to be helped by any conventional components such as a motor, a belt or gears.

While the preferred embodiment of the invention has been described above, it will be recognized and understood that various modifications may be made therein and the appended claims are intended to cover all such modifications that may fall within the spirit and scope of the invention.

What is claimed is:

1. A roller device with dynamic function, comprising:
   at least one roller unit, said roller unit provided with a shaft rod having its opposite ends immovably fixed, said shaft rod closely fitted through a coiled stator unit, said coiled stator unit including at least two silicon steel stators wound with a coil respectively, said two silicon steel stators having a center separating ring provided therebetween and a side separating ring at the outermost end of each silicon steel stators;
   said coiled stator unit covered by a tubular-shaped magnet rotor unit, said magnet unit comprising two semi-tubular-shaped casings, said casing having a plurality of magnets corresponding with said silicon steel stators axially and biasly positioned in the inner recessed wall, said casings covering said coiled stator unit and combined together by bolts;

said magnet rotor unit provided with a combination unit at opposite ends thereof, said combination unit having a bearing fitted around the outer side of said coiled stator unit and a bearing outer cover screwed on the opposite ends of said magnet rotor unit, said roller unit comprises gaps between said magnets and gaps in said silicon steel stators, said magnet rotor unit rotating around said coiled stator unit when said coiled stator unit is electrified; and the magnets are axially and biasly positioned and the gaps therebetween form an axially oblique line, and the gaps of the silicon steel stators form an axially straight line.

2. The roller device with dynamic function, as claimed in claim 1, wherein the at least one roller unit is plural in number, said shaft rod is configured to be firmly fitted around several of said roller units and the outermost one of said roller units has its outer end fitted with an outer rotating base, a stop bearing and an inner bearing base so that all of said roller units are positioned on the shaft rod.

3. The roller device with dynamic function as claimed in claim 1, wherein the at least one roller unit is plural in number and said roller units together with said shaft rod are placed in a hollow cylinder and said cylinder at its opposite ends are threadably fitted with an interior hollow end cover closely pushing against said roller units, said cylinder comprising an outer support base, a stop bearing and an inner support base that are orderly fitted around said shaft rod.

* * * * *